United States Patent [19]
Armstrong

[11] Patent Number: 6,105,653
[45] Date of Patent: Aug. 22, 2000

[54] AIR CIRCULATION BARRIER FOR VEHICLE INTERIOR

[76] Inventor: Michael R. Armstrong, 376 Knollglen, Irvine, Calif. 92714

[21] Appl. No.: 08/844,241

[22] Filed: Apr. 18, 1997

Related U.S. Application Data

[63] Continuation of application No. 08/560,974, Nov. 20, 1995, abandoned.

[51] Int. Cl.[7] .................................................. A47H 1/00
[52] U.S. Cl. ........................... 160/122; 160/57; 160/120; 160/370.22; 296/24.1; 296/97.7; 296/97.9; 296/141
[58] Field of Search ......................... 160/57, 58.1, 84.02, 160/370.22, 352, 120, 122; 296/24.1, 97.7, 97.8, 97.9, 97.11, 83, 136, 141, 143, 138, DIG. 1

[56] References Cited

U.S. PATENT DOCUMENTS

| | | | |
|---|---|---|---|
| 995,151 | 6/1911 | Kennedy | 160/58.1 |
| 1,500,014 | 7/1924 | Thurber | 296/143 |
| 1,600,562 | 9/1926 | Poloskie | 296/138 |
| 1,758,939 | 5/1930 | Fogh | 160/58.1 |
| 2,583,824 | 1/1952 | Dwinell et al. | 160/58.1 X |
| 4,232,725 | 11/1980 | Gidge | 160/332 |
| 4,359,081 | 11/1982 | Brower | 160/243 |
| 4,560,245 | 12/1985 | Sarver | 296/83 X |
| 4,588,223 | 5/1986 | Ledenyi | 296/DIG. 1 X |
| 4,669,775 | 6/1987 | Mathers | 296/143 X |
| 4,818,007 | 4/1989 | Mahoney | 296/24.1 |
| 4,874,026 | 10/1989 | Worrall | 160/122 X |
| 5,097,886 | 3/1992 | Moyet-Ortiz | 160/368.1 |
| 5,101,878 | 4/1992 | Thomas | 160/120 X |
| 5,238,282 | 8/1993 | Watson et al. | 296/24.1 |
| 5,288,122 | 2/1994 | Pilhall | 296/24.1 |
| 5,429,406 | 7/1995 | Huang | 296/136 X |
| 5,433,499 | 7/1995 | Wu | 296/136 X |
| 5,509,713 | 4/1996 | Hou | 296/138 |
| 5,536,057 | 7/1996 | Stewart | 296/24.1 |
| 5,632,520 | 5/1997 | Butz | 296/24.1 |
| 5,732,759 | 3/1998 | Wang | 160/352 X |
| 5,848,817 | 12/1998 | Niehaus | 296/24.1 |
| 5,860,466 | 1/1999 | Kao | 160/370.22 |
| 5,941,265 | 8/1999 | Zheng | 296/97.7 X |

FOREIGN PATENT DOCUMENTS

| | | | |
|---|---|---|---|
| 508818 | 10/1992 | European Pat. Off. | 296/24.1 |

*Primary Examiner*—Daniel P. Stodola
*Assistant Examiner*—Bruce A. Lev
*Attorney, Agent, or Firm*—Roy A. Ekstrand

[57] ABSTRACT

A header is received within an interior of a vehicle and secured against the roof portion thereof to extend transversely with respect to the front to back directions of the vehicle. The header supports a roller which in turn supports a flexible transparent or clear curtain which may be drawn downwardly to provide a portion of the vehicle air barrier to divide one portion of a vehicle interior from the other. A pair of side curtains are provided along each edge of the center curtain and are extendable outwardly to provide a further barrier to air circulation or air flow past the barrier. In one embodiment, the side curtains are formed of a flexible material and are hingedly secured to the vertical edges of the center curtain. In an alternate embodiment, a pair of side rollers are pivotally secured to the header and support respective side curtains which may be extended downwardly and drawn outwardly to complete the air barrier.

14 Claims, 4 Drawing Sheets

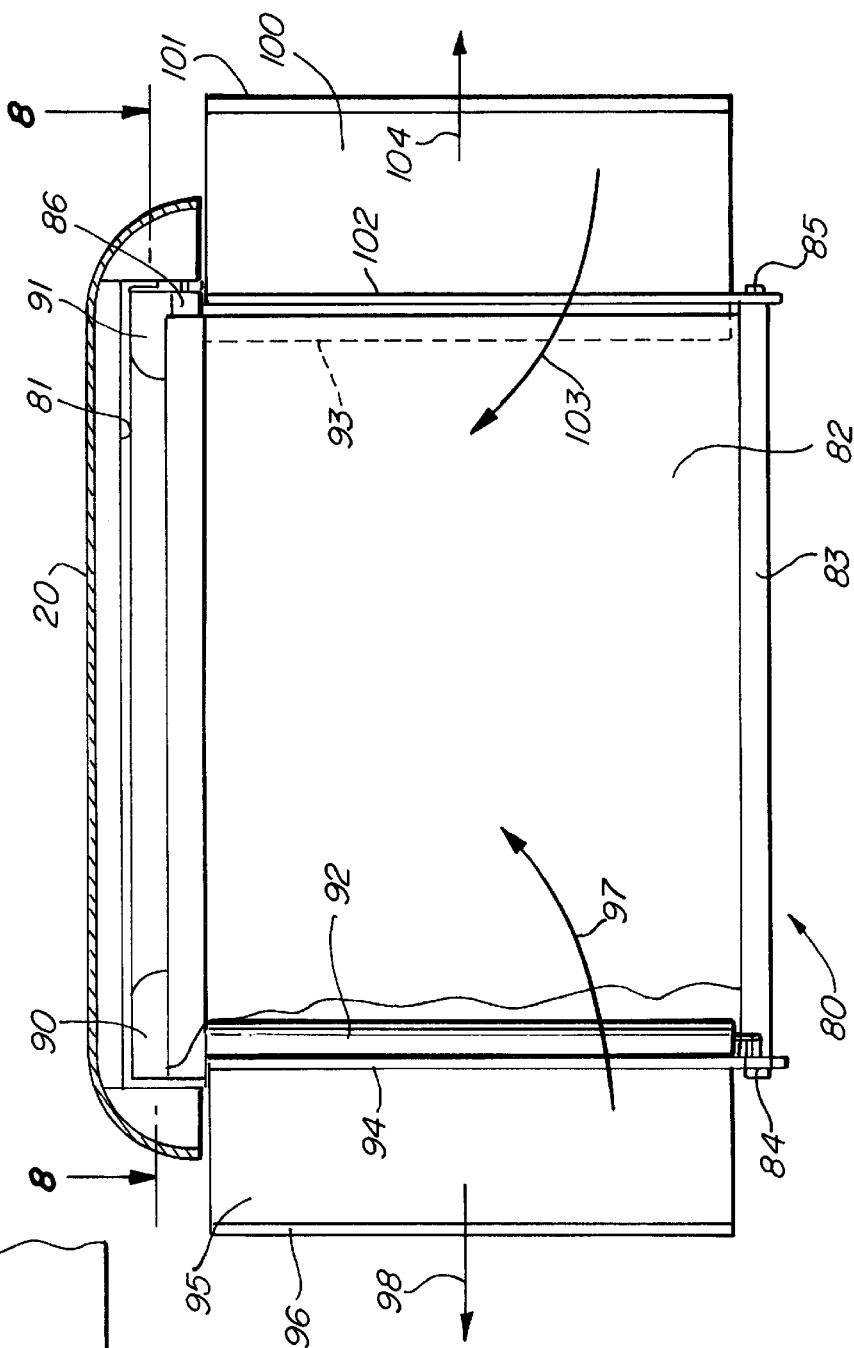
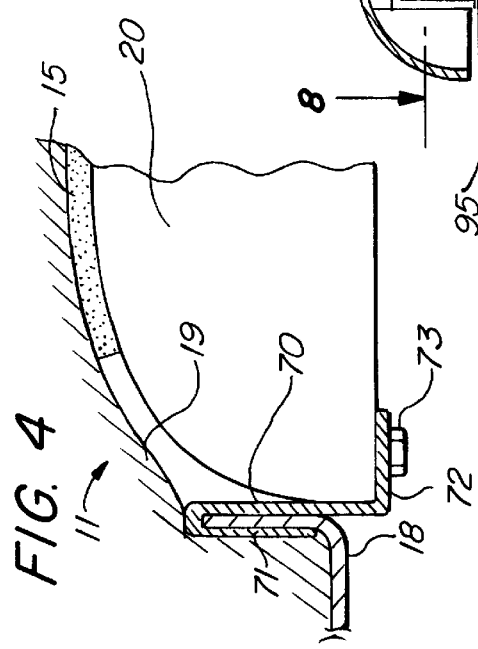

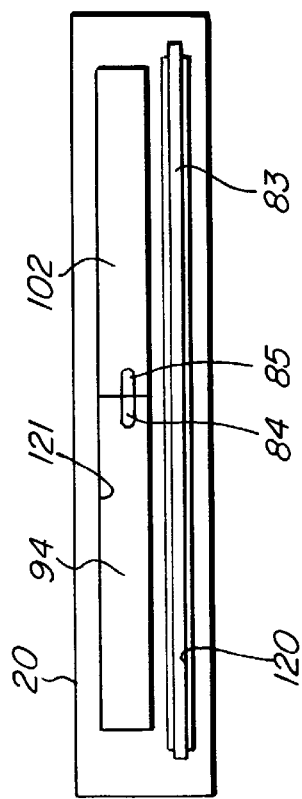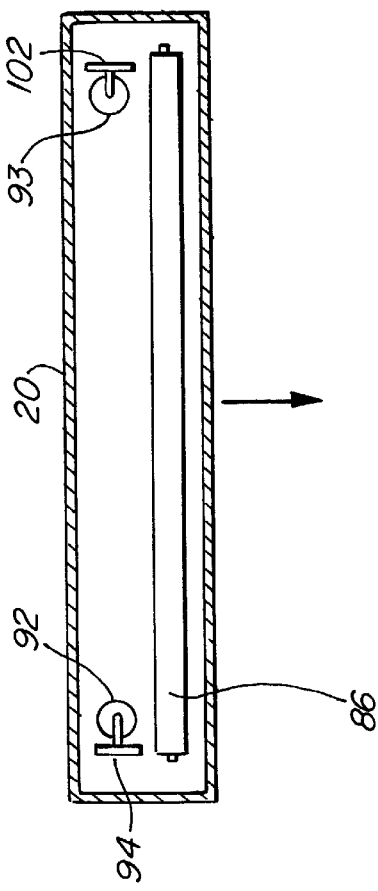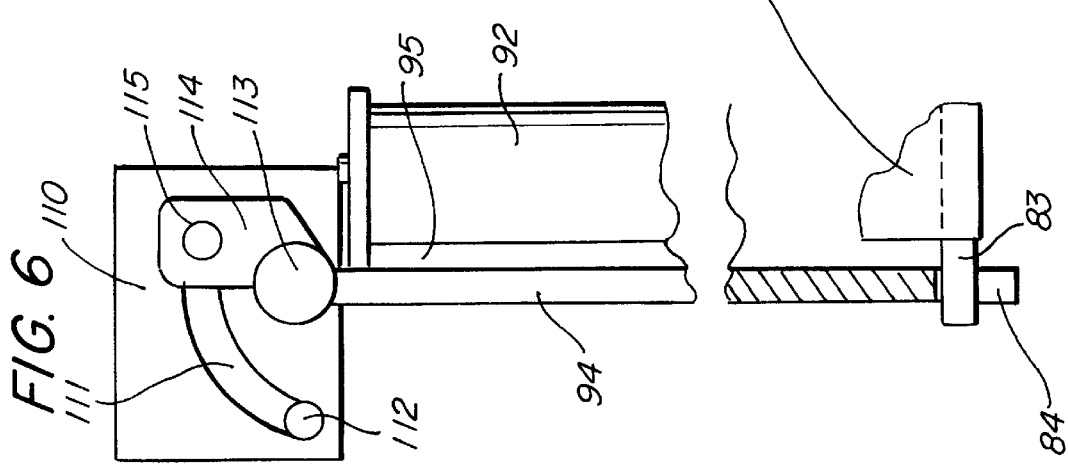

AIR CIRCULATION BARRIER FOR VEHICLE INTERIOR

This application is a continuation of application Ser. No. 08/560,974, filed Nov. 20, 1995, now abandoned.

FIELD OF THE INVENTION

This invention relates generally to vehicle interior apparatus and particularly to air circulation barriers utilized for compartmentalizing vehicle interiors in order to reduce heating and air conditioning requirements.

BACKGROUND OF THE INVENTION

A common feature shared by virtually all motor vehicles used for private and commercial transportation is the provision of a suitable interior space within the vehicle for seating and accommodating passengers. Thus, in a typical automobile, the vehicle interior generally supports a front seat and rear seat able to accommodate four to six people. In certain vehicles, a relatively larger interior space is provided. Such vehicles include sport and utility vehicles, station wagons, recreational vehicles and vehicles generally described as vans or minivans. The common feature of such vehicles is the provision of a substantially larger interior space for passengers and other objects within which the front and rear seats are positioned. In addition, some vehicles such as extended length vans provide a third seat and so on. Cargo space is often provided at the rear of such vehicles. For passenger and driver comfort, environmental systems within the vehicle such as heating and air conditioning are provided to circulate appropriately heated or cooled air throughout the interior of the vehicle.

As a practical matter, such vehicles while able to accommodate a substantial number of passengers together with a driver are often driven for extended periods of time by a driver alone or a driver with a passenger in the front seat leaving the remainder of the vehicle empty and unoccupied. This creates a basic inefficiency of such vehicles with respect to heating and air conditioning in that the entire volume must be heated or cooled despite the relatively small portion of the interior volume which is occupied by the front seat driver and passenger. The same principle applies where additional passengers are seated in the rear seat with respect to the additional space behind the rear seat which is unoccupied but which nonetheless must be heated or cooled to maintain proper temperature within the vehicle interior.

Thus, a basic difficulty or problem arises in such popular sport utility and recreational vehicles having large interiors with respect to excessive air conditioning and heating loads imposed upon the environmental system. In addition, recent model vehicles employ less efficient coolants such as R134 in place of Freon which has been banned for use because of environmental concerns. This places further demands on air conditioning systems, particularly in large volume vehicles. To meet these problems, practitioners in the art have endeavored to provide various apparatus for dividing or compartmentalizing the interior of the vehicle. The most common apparatus includes a roll-up curtain or shade which is positioned within the vehicle interior and usually secured to the vehicle roof in some fashion. The idea is to roll-down the curtain or shade to provide a vertically extending air barrier or air circulation impediment which separates or compartmentalizes the vehicle interior between an occupied portion (such as the front seats) and an unoccupied portion (such as the rear seats). For convenience, the curtain is preferably removable or rolls up or down to provide storage when not in use.

U.S. Pat. No. 4,818,007 issued to Mahoney sets forth a VEHICLE SCREEN/SHADE for providing an air flow barrier within the interior of a motor vehicle. The screen includes a transparent portion and an opaque portion and is mounted within the interior of the vehicle such that the transparent portion provides no substantial impediment to a viewer's visibility. A member for mounting the screen within the vehicle is provided which is capable of retracting the screen. The screen is movable from a first retracted position to a second elongated position in which the opaque portion extends behind the driver's seat and the transparent portion is positioned in line with the driver's visibility field. Additionally, the shade/screen is movable to a forward position extending from the dashboard of the car rearwardly spanning the front seat area to provide an opaque sunscreen barrier when the vehicle is not in use.

While prior art air barriers such as that described above in U.S. Pat. No. 4,818,007 have provided some capability for compartmentalizing or separating vehicle interiors into used and unused spaces, they are subject to substantial limitation. One such limitation arises from the straight vertical edges of the curtain which accommodate the roll-up feature for storage. Unfortunately, the majority of vehicles within which such air barriers or screens are usable have interior side walls which are curved outwardly rather than straight vertical walls. As a result, a substantial gap exists on each side of the curtain between the side edge and the curved interior wall of the vehicle. This gap is often quite large due to the substantial curvature of the vehicle interior wall giving rise to a basic inefficiency of the curtain. With the basic objective being the provision of an air flow or air circulation barrier substantially compromised by the existence of such large side gaps, the effective isolation or compartmentalization of the vehicle interior is correspondingly reduced in effect. Air flows freely on each side of the curtain through the gaps reducing the curtain's effectiveness. In addition, the manner in which such prior art devices are supported and operated is often cumbersome and often results in a rather unsightly structure for the vehicle interior.

There remains, therefore, a need in the art for an improved air circulation barrier for vehicle interiors which is not subject to the above-described problems and limitations. More specifically, there remains a need in the art for an air circulation barrier for vehicle interior which is attractive in appearance and which provides a more effective air barrier when used in a vehicle interior having outwardly curving vehicle walls.

SUMMARY OF THE INVENTION

Accordingly, it is a general object of the present invention to provide an improved air circulation barrier for vehicle interiors. It is a more particular object of the present invention to provide an improved air circulation barrier for vehicle interiors which is attractive in appearance and which conveniently and easily operates. It is a still more particular object of the present invention to provide an improved air circulation barrier for vehicle interiors which accommodates a variety of vehicle wall shapes and contours within the vehicle interior while maintaining an effective air circulation barrier.

In accordance with the present invention, there is provided for use in a vehicle having an interior roof, a pair of sidewalls and an interior floor, an air circulation barrier comprising: a header securable to the interior roof; a roller rotatably supported within the header; a flexible center curtain rollable upon the roller to be rolled thereon or unrolled to extend downwardly, the center curtain defining edges spaced from the sidewalls resulting in spaces between the side edges and the sidewalls; and a pair of side curtains supported along the side edges and extending outwardly from the center curtain toward the sidewalls to cover portions of the spaces.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 4 sets forth a partial section view of the attachment mechanism for the present invention air circulation barrier;

FIG. 5 sets forth a front view of an alternate embodiment of the present invention air circulation barrier;

FIG. 6 sets forth a partial section view of the pivotal support for the embodiment of FIG. 5;

FIG. 7 sets forth a view of the underside of the header portion of the embodiment of FIG. 5; and FIG. 8 sets forth a horizontal section view taken along section lines 8—8 in FIG. 5.

DESCRIPTION OF THE PREFERRED EMBODIMENTS

Figure 1:
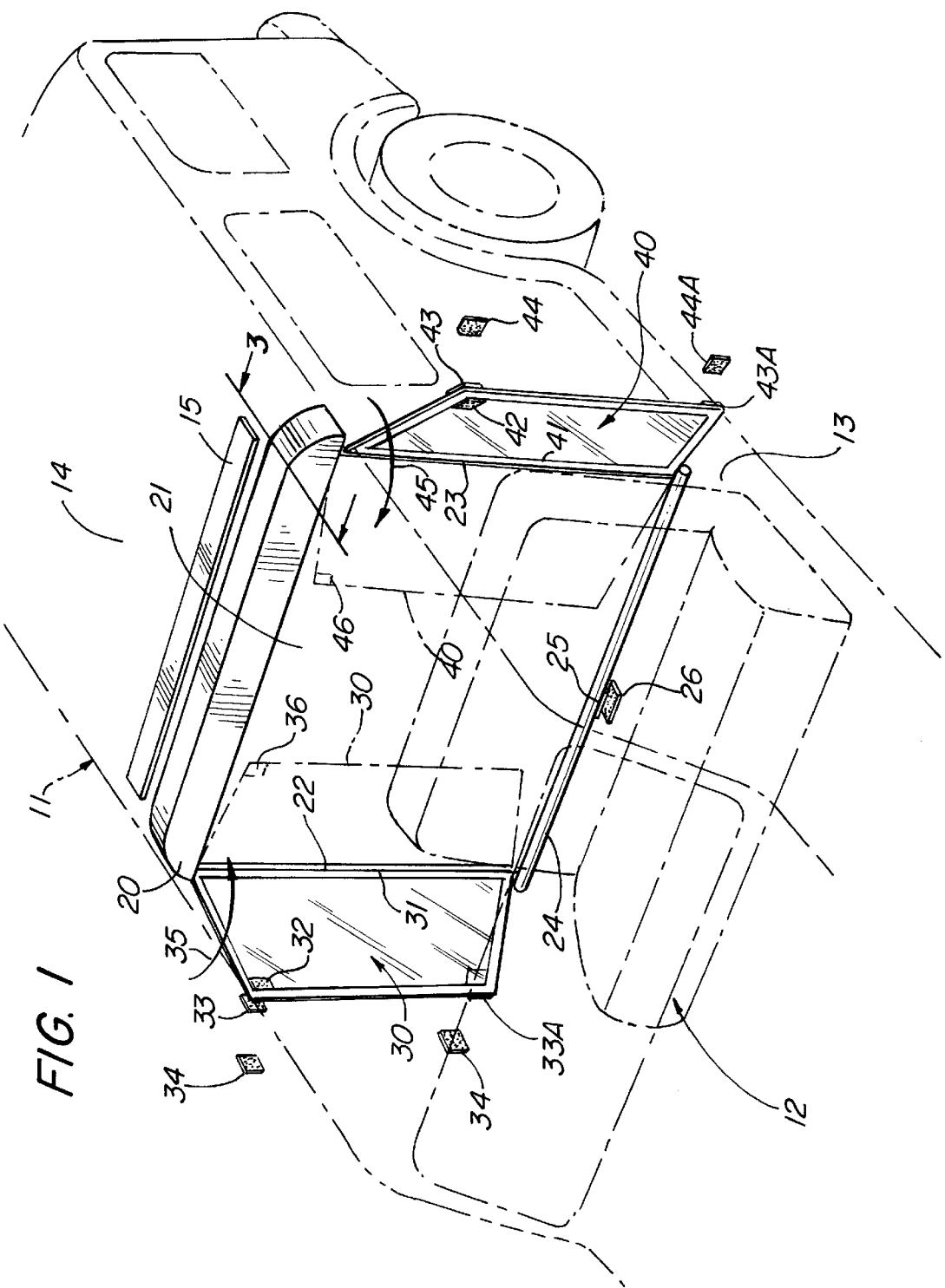
FIG. 1 sets forth a perspective view of the present invention air circulation barrier within a typical vehicle shown in dashed-line representation.

FIG. 1 sets forth a perspective view of an air circulation barrier for vehicle interior constructed in accordance with the present invention and generally referenced by numeral 10. For purposes of illustration to show a typical vehicle installation of the present invention barrier, FIG. 1 also shows portions of a typical sport vehicle shown in dashed-line fantom and generally referenced by numeral 11. It will be apparent to those skilled in the art that vehicle 11 is shown by way of example and that the present invention air circulation barrier is not limited to any particular type of vehicle interior. It should also be noted that FIG. 1 illustrates the installation of the present invention air circulation barrier within the vehicle isolating the front seat portion from the remainder of the vehicle. It will be equally understood that air circulation barrier 10 may be installed behind the rear seat (not shown) of a vehicle isolating the front and rear seats from the rear cargo portion and so on without departing from the spirit and scope of the present invention.

More specifically, barrier 10 includes an elongated header 20 conformed to generally correspond with the interior surface of roof 14 of vehicle 11. Header 20 is in the example of FIG. 1 positioned above and behind front seat 12 of vehicle 11. Front seat 12 is also shown in dashed-line fantom to avoid obscuring the present invention air circulation barrier. It will be understood that in accordance with conventional fabrication techniques, vehicle 11 also defines an interior floor surface 13 upon which front seat 12 is supported also in accordance with conventional fabrication techniques. As is better seen in FIG. 3, header 20 includes a roller support 50 having a plurality of support brackets such as bracket 51 shown in FIG. 3 which are received within the interior of header 20 and which support a generally planar substantially rectangular center curtain 21. Curtain 21 is formed of a transparent or clear material such as clear plastic. Alternatively, center curtain 21 may in certain applications be lightly tinted so long as driver visibility is not impaired. An elongated pull bar 24 is secured to the bottom end of center curtain 21 and supports a latch member 25. Correspondingly, a cooperating latch plate 26 is secured to floor 13 behind front seat 12 and generally aligned with latch 25. The cooperative structures of latch 25 and latch plate 26 may be provided using virtually any of the presently available attachment mechanisms. For example, latch 25 may support a downwardly facing Velcro fabric attachment surface while latch plate 26 may define an upwardly facing cooperating fabric attachment pad allowing latch plate 26 to engage latch 25 and secure pull bar 24 and center curtain 21. Alternatively, latch 25 may define a mechanical clasp which cooperates with a corresponding conventional latch upon plate 26. In any event, the important function of latch 25 and latch plate 26 is to provide the capability of securing pull bar 24 and center curtain 21 to floor 13.

Barrier 10 further includes a pair of fabric hinge members 31 and 41 secured to edges 22 and 23 of center curtain 21. A pair of side curtains 30 and 40 are pivotally secured to hinges 31 and 41 respectively. In the preferred embodiment of the present invention, side curtains 30 and 40 are formed of a clear plastic flexible material substantially the same as center curtain 21. Alternatively, however, side curtains 30 and 40 may be formed of virtually any flexible material having the capability of being rolled upon the support roller within header 20 in the same manner as center curtain 21 is rolled. A pair of fabric attachment pads 36 and 46 such as the well known hook and loop attachments also known as "Velcro attachments" are secured to the surface of center curtain 21. Correspondingly, sides curtains 30 and 40 support a pair of attachment pads 32 and 42 respectively at the upper corners thereof. In accordance with the present invention, side curtains 30 and 40 are foldable inwardly about hinges 31 and 41 in the directions indicated by arrows 35 and 45 to the dashed-line positions shown extending across and resting upon center curtain 21. To provide attachment of side curtains 30 and 40 to center curtain 21, fabric attachment pads 36 and 46 are positioned upon center curtain 21 to be aligned with attachment pads 32 and 42 when side curtains 30 and 40 are folded inwardly. Thus, in the folded position shown in dashed-line representation, side curtains 30 and 40 overlie center curtain 21 and are secured thereto. Alternatively, the side curtains may be held in the folded position by means of an elasticized cord attached to the upper corners of the side curtains. As a result and in accordance with an important aspect of the present invention, the combined structures of center curtain 21 and folded side curtains 30 and 40 may then be rolled upon the support roller within header 20 of center curtain 21 to allow the entire air barrier to be rolled upwardly head 20. In accordance with conventional fabrication techniques, the roller support for center curtain 21 is spring-biased to provide an upwardly drawing tension upon center curtain 21. In the lowered position shown, the cooperation of latch 25 and latch plate 26 resists this upward force and maintains the lowered position of air barrier 10.

In further accordance with the present invention, additional pairs of attachment pads 33, 33A, 43 and 43A are secured to the opposite sides of side curtains 30 and 40 respectively at the outer corners of side curtains 30 and 40. A further plurality of fabric attachment pads 34, 34A, 44 and 44A are secured to a conveniently located interior surface of vehicle 11 such that pads 33, 33A, 43 and 43A may engage pads 34, 34A, 44 and 44A respectively to position side curtains 30 and 40 in an outwardly extending direction to provide the additional covering best seen in FIG. 2. As described above, prior art air circulation barriers have been subject to the undesired creation of gaps between the air barrier and the vehicle wall. In accordance with the present invention, this shortcoming is overcome as side curtains 30 and 40 are positioned in the manner seen in FIG. 2 to generally extend along the interior side wall surfaces of vehicle 11 to cover the gap which would otherwise be present in the prior art structures. A resilient compressible gasket 15 is interposed between the upper surface of header 20 and the lower surface of roof 14 to provide a better installation of header 20.

Figure 2:
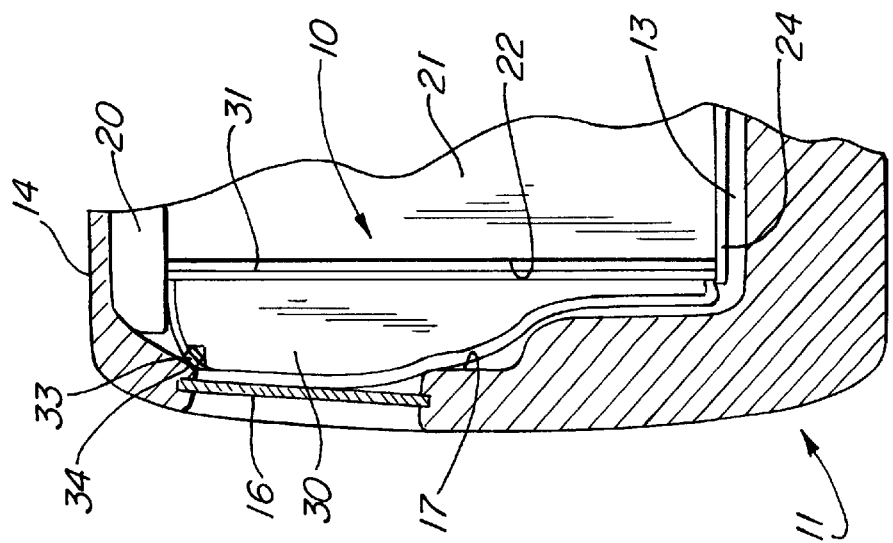
FIG. 2 sets forth a partial section view of the side portion of the air circulation barrier of FIG. 1.

FIG. 2 sets forth a partial section view of vehicle 11 supporting air circulation barrier 10. As described above, air circulation barrier 10 includes a header 20 secured against to the undersurface of roof 14 of vehicle 11. Header 20 supports a flexible center curtain 21 having an edge 22 to which a hinge 31 is secured. Hinge 31 is preferably formed of a flexible fabric or plastic material and further supports a flexible side curtain 30. Side curtain 30 includes a fabric attachment pad 33 facing outwardly from the outer surface of side curtain 30. Correspondingly, a fabric attachment pad 35 is secured to the interior wall of vehicle 11 such that the outwardly angled position of side curtain 30 brings pad 33 into contact with pad 34 to secure side curtain 33 against the interior wall of vehicle 11. As described above, vehicle 11 includes a roof 14 and floor 13 of the interior of vehicle 11. A side window 16 extends downwardly from roof 14 in accordance with conventional automotive fabrication techniques and is joined to an interior wall 17. Interior wall 17 shows multiple curves and contoured surface typical of vehicle interior walls. In accordance with an important aspect of the present invention, the flexible structure of side curtain 30 allows side curtain 30 secured at pads 33 and 34 on the upper corner thereof to drape downwardly against window 16 and interior wall 17. The flexible structure of curtain 30 further allows side curtain 32 to generally conform to the multiply contoured surface of interior wall 17 and the recessed surface of window 16. Accordingly, the provision of side curtain 30 provides a closure of an extended gap which would otherwise exist between center curtain 21 and interior wall 17 and window 16 of vehicle 11. As a result, the present invention air circulation barrier provides improved air barrier action and better encapsulizes the vehicle interior. It will be apparent to those skilled in the art that side curtain 40 (seen in FIG. 1) performs in substantially the same manner on the opposite side of vehicle 11 as that shown in FIG. 2 for side curtain 30. As a result, both sides of center curtain 22 are provided with extending side curtains which generally conform to the vehicle interior walls despite their multiple curved character.

Figure 3:
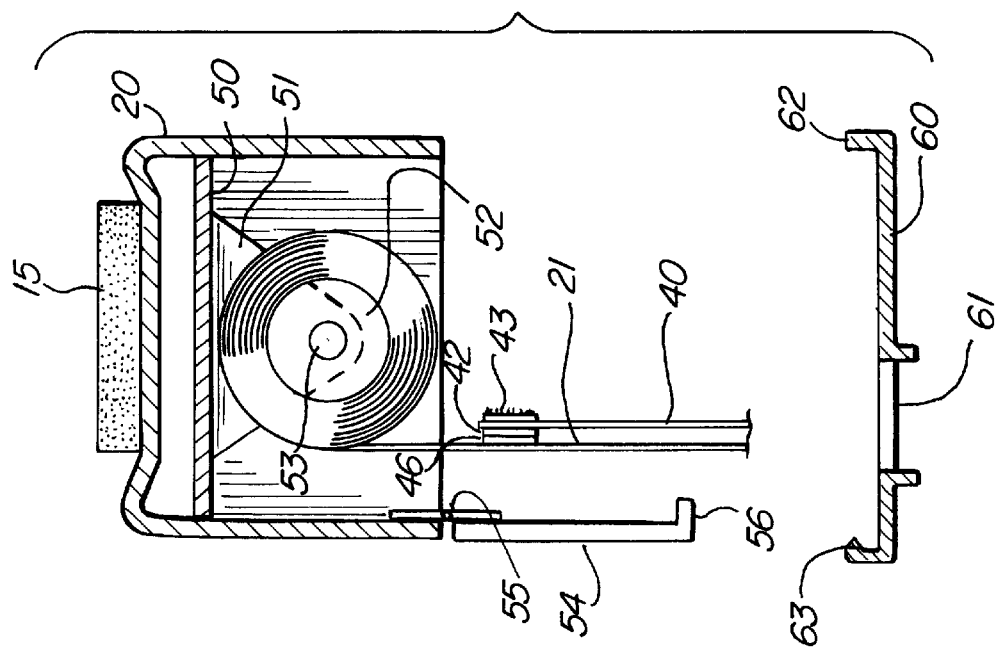
FIG. 3 sets forth a section view of the present invention air circulation barrier taken along section lines 3—3 in FIG. 1.

FIG. 3 sets forth a section view of the present invention air barrier showing header 20 secured against gasket 15. Header 20 supports a roller support 50 preferably formed of a high strength plastic or metal material which is secured within header 20 and extends transversely across the interior cavity of header 20. Roller support 50 defines a pair of downwardly extending support brackets on each end thereof such as bracket 51 which in turn receive an axle 53 which supports roller 52. While not seen in FIG. 3, roller 52 includes an internal return spring constructed in accordance with conventional fabrication techniques which provides a torsional spring force imposed upon roller 52 tending to draw center curtain 21 upwardly to roll up within header 20 upon roller 52. While not in FIG. 3, it will be understood that an additional support bracket substantially the same as bracket 51 extends downwardly from the opposite side of roller support 50 to support each side of roller 52. Center curtain 21 is shown extending downwardly from roller 52 to the extended position shown in FIG. 1. As described above, center curtain 21 supports an attachment pad 46 on the frontal surface thereof. As is also described above, side curtains 30 and 40 may be folded inwardly upon center curtain 21 to facilitate rolling of the entire structure upwardly into header 20. Accordingly, FIG. 3 shows side curtain 40 folded inwardly to the closed position shown in dashed-line representation in FIG. 1. Side curtain 40 supports an attachment pad 42 which secures side curtain 40 to center curtain 21 in the closed position. Side curtain 40 also supports attachment pad 43 which as is seen above in FIG. 1 cooperates with pad 44 secured to vehicle 11 to maintain side curtain 40 in the open position.

FIG. 3 also shows a cap member 54 having a snap 56 formed thereon which is pivotally coupled to the underedge of header 20 by a hinge 55. In the open position shown, cap 54 does not interfere with the downward extension of center curtain 21. Thus, center curtain 21 as well as side curtains 30 and 40 may be rolled upwardly upon roller 52 while cap 54 is in the open position. Once center curtain 21 as well as side curtains 30 and 40 are rolled upon roller 52 while cap 54 is in the open position. Once center curtain 21 as well as side curtains 30 and 40 are rolled upon roller 52, cap 54 is pivoted about hinge 55 securing snap 56 to the opposite side of header 20 and providing closure of the header.

Alternatively, cap 54 may be eliminated and a pivotally secured cap 60 shown in FIG. 3 may be snap-fitted to the underside of header 20 to avoid the need for opening and closing cap 54. To facilitate the withdrawal and unrolling of center curtain 21 and side curtains 30 and 40 while cap 60 remains secured to header 20, a slot 61 extending the length of cap 60 is formed through which center curtain 21 and side curtains 30 and 40 are passed during rolling and unrolling of the curtains. In the event cap 60 is used in place of cap 54, the preferred fabrication of the invention provides that slot 61 is slightly smaller in span than pull bar 24 (seen in FIG. 1) to facilitate easy withdrawal of the curtains.

FIG. 4 sets forth a partial section view of the present invention air circulation barrier showing the attachment of header 20 to the interior rail or molding of vehicle 11. Thus, vehicle 11 utilizes a side rail 18 which in accordance with conventional fabrication techniques extends generally along the upper wall portion of the vehicle. Vehicle 11 further includes a resilient roof pad 19 which extends substantially across the entire interior roof surface of vehicle 11. In accordance with the present invention, a support clip 70 having a U-shaped portion 71 is inserted between roof pad 19 and rail 18 to embrace a portion of rail 18 for physical support. Roof pad 19 being resilient tends to conform about U-shaped portion 71 maintaining the general quality appearance of the vehicle. Attachment clip 70 includes an inwardly extending flange 72 upon which one end of header 20 rests. Gasket 15 is interposed between roof pad 19 and the upper surface of header 20 to provide a secure custom fit. For purposes of more secure attachment, a fastener 73 may be driven through an aperture formed in flange 72 and a corresponding aperture formed in header 20. While fastener 73 provides increased security of attachment, it has been found generally that the compression fit of header 20 and gasket 15 against flange 72 tends to provide adequate security of attachment and maintains easy removability for header 20. It will be apparent by examination of FIG. 4 that a corresponding structure is provided on the remaining end of header 20 on the opposite side of the vehicle interior to complete the secure attachment of header 20. Alternate means of supporting the header may be employed such as spring clips, screws, bolts or pins.

FIG. 5 sets forth a partially sectioned view of an alternate embodiment of the present invention air circulation barrier generally referenced by numeral 80. Barrier 80 includes a header 20 having a roller support 81 supported therein in accordance with conventional fabrication techniques. Support 81 further supports a pair of pivotal attachments 90 and 91 described below in greater detail together with a center roller 86. Roller 86 is constructed in accordance with conventional fabrication techniques and includes a spring-loaded tensioning mechanism tending to roll center curtain 82 upwardly upon roller 86. Center curtain 82 is preferably formed of a clear or transparent flexible plastic material and extends downwardly to a horizontally extending pull bar 83 on the lower edge thereof. Center curtain 82 and pull bar 83 together with roller 86 function in substantially the same manner as described above for center curtain 21 and its associated pull bar and roller support. Barrier 80 further includes a pair of downwardly extending plates 94 and 102 pivotally supported by pivot supports 90 and 91 respectively. Plate 94 defines a notch 84 which receives the end portion of pull bar 83 in the manner better seen in FIG. 6. Similarly, plate 102 defines a notch 85 which receives the remaining end of pull bar 83. The tension provided by roller 86 urging center curtain 82 upwardly to the rolled position draws pull bar 83 against notches 84 and 85 and thus maintains center curtain 82 in a substantially vertical position as shown in FIG. 5. Center curtain 82 may be rolled up by simply drawing curtain 82 downwardly to withdraw pull bar 83 from notches 84 and 85 and thereafter allowing roller 86 to roll center curtain 82 into header 20.

Side roller 92 supports a side curtain 95 rolled thereon which in turn supports a pull bar 96. Side curtain 95 may be drawn outwardly from roller 92 by pulling it in the direction indicated by arrow 98. Plate 94 provides a support for side roller 92. Correspondingly, roller 93 is supported by plate 102 upon pivotal attachment 91 and further supports a flexible side curtain 100 having a pull bar 101 secured to the end portion thereof. Side curtain 100 is receivable upon roller 93 or may be drawn therefrom in an outward direction as indicated by arrow 104.

Air barrier 80 is shown in its optimally extended position in FIG. 5 suitable for providing the desired air barrier between selected portions of a vehicle interior. Air circulation barrier 80 may be withdrawn or closed by simply pulling pull bar 83 downwardly to release bar 83 from notches 84 and 85 and thereafter rolling center curtain 82 upon roller 86. The closure of air circulation barrier 80 is completed by rolling side curtains 95 and 100 upon rollers 92 and 93 and thereafter pivoting plates 94 and 102 upwardly in the directions indicated by arrows 97 and 103. The entire structure is then folded within header 20. Alternatively, center curtain 82 may be extended downwardly to the floor of the vehicle and fastened thereto.

FIG. 6 sets forth a partial section view of the pivotal attachment of plate 94 within header 20. It will be apparent to those skilled in the art, however, that different pivotal attachments may be utilized in practicing the present invention without department from the spirit and scope thereof. Accordingly, plate 94 is secured to a pivot shaft 113 upon a plate 110. Plate 110 defines an arcuate track 111 having a recess 112 defined therein. While not seen in FIG. 6, plate 110 should be understood to define a second recess underlying wall 115 of arm 114. Thus, in the position shown in FIG. 6, wall 115 of arm 114 is partially received within the underlying recess in plate 110 (not shown) to provide detented positioning of plate 94 in the vertical position shown. Alternatively, plate 94 may be pivoted upwardly about pivot 113 bringing ball 115 into recess 112 and thereafter detentably securing plate 94 in the horizontal closed position. Plate 94 supports side roller 92 which in turn supports side curtain 95. As described above, the downward extension of center curtain 82 is maintained in the position shown in FIG. 5 by the insertion of one end of pull bar 83 into notch of plate 94. Thereafter, the tension applied to center curtain 82 draw pull bar 83 upwardly against notch 84 providing maintenance of the extended position shown in FIG. 5. It will be understood that side roller 93 is supported by pivot 91 (both seen in FIG. 5) in the identical manner to that shown in FIG. 6.

FIG. 7 sets forth a bottom view of header 20 showing slot 120 extending across the lower surface of header 20. Slot 120 receives center curtain 82 as curtain 82 is drawn upwardly upon roller 86 (seen in FIG. 5). Pull bar 83 is greater in length than slot 120 and thus is not passed through slot 120. This facilitates again drawing center curtain 82 downwardly by simply grasping bar 83 and pulling it downward. The lower surface of header 20 further defines an elongated slot 121 within which plates 94 and 102 defining respective notches 84 and 85 are received when the side curtain roller supports are pivoted upwardly to the closed position.

FIG. 8 sets forth a section view of air circulation barrier taken along section lines 8—8 in FIG. 5. It should be understood FIG. 8 is substantially simplified having much of the support structure omitted to avoid unduly cluttering the figure. Of importance in FIG. 8 is the position of roller 86 within header 20 ahead of or toward the front of the vehicle with respect to plates 94 and 102 which in turn support side rollers 92 and 93.

What has been shown is an air circulation barrier for vehicle interior which overcomes the problems associated with large air gaps between conventional air flow barrier curtains and which thus is more effective and efficient in maintaining the encapsulizing or dividing of portions of a vehicle interior. The air circulation barrier shown is able to adapt to and conform to a variety of vehicle interior sizes and sidewall contours and shapes.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An air circulation barrier comprising the combination of:
   a vehicle interior having an interior roof, a pair of sidewalls, an interior floor and at least one seat;
   a header securable to said interior roof of a vehicle behind said at least one seat;
   a roller rotatably supported within said header;
   a flexible center curtain rollable upon said roller to be rolled thereon or unrolled to extend downwardly, said center curtain defining side edges spaced from said sidewalls to define spaces between said side edges and said sidewalls; and a pair of side curtains supported along said side edges and extending outwardly from said center curtain toward said sidewalls to cover portions of said spaces.

2. An air circulation barrier as set forth in claim 1 wherein said side curtains are formed of a flexible sheet material and wherein said air circulation barrier includes a pair of flexible hinges for securing said side curtains to said side edges.

3. An air circulation barrier as set forth in claim 1 further including a pair of elongated flexible fabric hinges attaching said side curtains to said center curtain.

4. An-air circulation barrier comprising the combination of:

- a vehicle interior having an interior roof, a pair of sidewalls, an interior floor and at least one seat;
- a header;
- means for securing said header against said roof at an intermediate location within said vehicle interior;
- a roller supported within said header having a flexible center curtain rollable thereon between a raised position and a lowered position for dividing said vehicle interior;
- a pair of flexible side curtains foldably secured to each side of said center curtain, said side curtains foldable between a folded position upon said center curtain and an extended position; and
- attachment means for securing said side curtains against said sidewalls in said extended position.

5. An air circulation barrier as set forth in claim 4 wherein said center curtain and said side curtains include cooperating attachment pads for securing said side curtains in said folded position and wherein said roller when rotated rolls both said center curtain and said side curtains into said header.

6. An air circulation barrier as set forth in claim 5 further including at least one attachment pad having means for attachment to each vehicle sidewall and wherein said attachment means further includes at least one cooperating pad on each of said side curtains cooperating with said attachment pads on said vehicle sidewalls to secure said side curtains against said vehicle sidewalls.

7. An air circulation barrier as forth in claim 6 wherein said attachment means include hook and loop fabric attachment pads.

8. An air circulation barrier as set forth in claim 7 wherein said flexible side curtains and said flexible center curtain are each formed of a clear plastic material.

9. An air circulation barrier as set forth in claim 8 further including a pair of elongated flexible fabric hinges attaching said side curtains to said center curtain.

10. An air circulation barrier comprising the combination of:

- a vehicle interior having an interior roof, a pair of sidewalls, an interior floor, a front seat and a rear seat;
- a header and means for securing said header to said roof behind said front seat;
- a roller supported within said header;
- a flexible center curtain having side edges, said center curtain being rolled upon said roller for storage and unrolled in a vertical path from said header to divide the interior space of the vehicle such that a pair of gaps are formed between said side edges and said sidewalls; and
- a pair of side curtains extending from said side edges toward said sidewalls to at least partially span said gaps.

11. An air circulation barrier as set forth in claim 10 wherein said side edges include a pair of flexible hinges for foldably securing said side curtains to said side edges.

12. An air circulation barrier as set forth in claim 11 further including a first plurality of attachment pads for securing said side curtains against said center curtain in a folded position and a second plurality of attachment pads for securing said side curtains in an extended position in contact with sidewalls of the vehicle.

13. An air circulation barrier as set forth in claim 10 further including:

- a pair of side rollers each pivotally coupled to said header and each pivotable between a horizontal position within said header and a vertical position extending downwardly from said header along each of said side edges; and
- means for securing said pair of side rollers in said horizontal and vertical positions,
- said side curtains being rolled upon said side rollers.

14. An air circulation barrier as set forth in claim 13 wherein said center curtain includes a bottom pull bar having opposed ends and wherein said side rollers include means for engaging said opposed ends in said vertical position.

* * * * *